3,737,351
METHOD AND APPARATUS FOR THE CONTINUOUS MANUFACTURE OF CHIP BOARD FROM BINDER AND WOOD CHIPS
Hubert Eitel, 3371 Teichhutte, Harz Nr. 24, Germany
Filed Dec. 1, 1970, Ser. No. 93,989
Claims priority, application Germany, July 14, 1970,
P 20 34 853.2, P 20 34 867.8, P 20 34 868.9
Int. Cl. B29j 5/00; B32b 21/00; B29d 7/14
U.S. Cl. 156—62.2          10 Claims

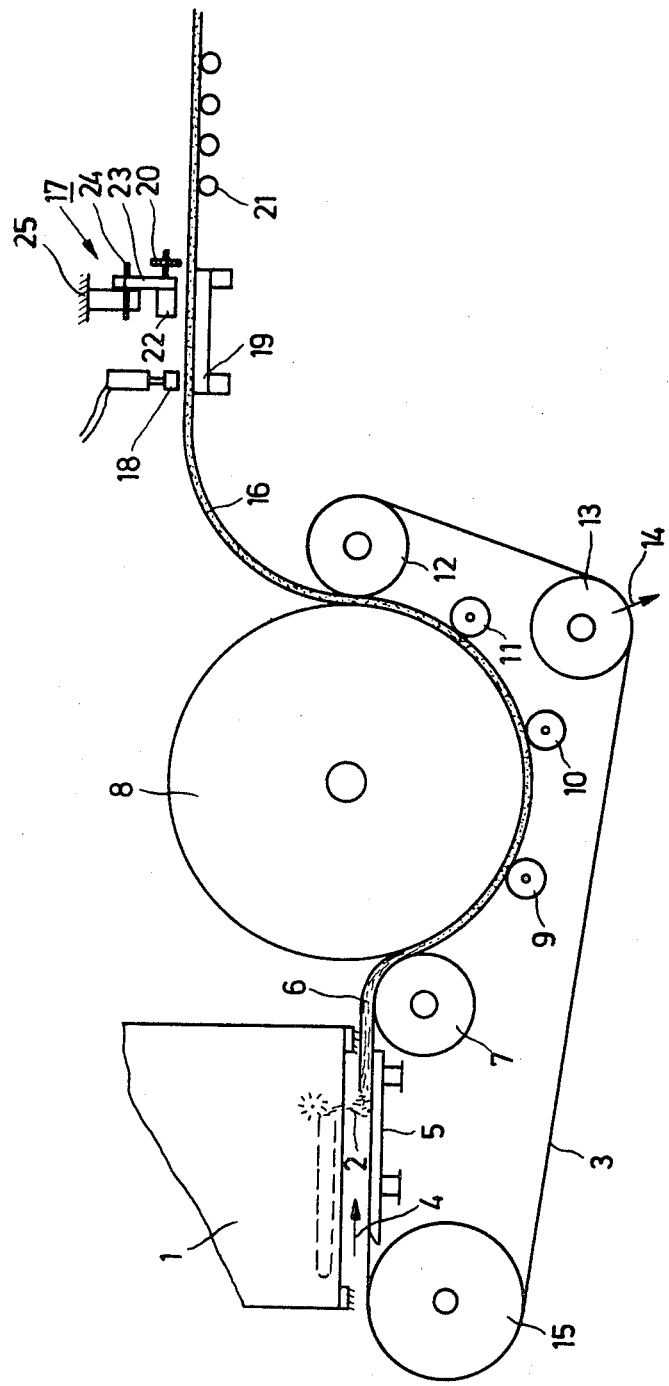

ABSTRACT OF THE DISCLOSURE

A continuous apparatus for making chip board having a large heated horizontally-disposed drum and an endless metal belt encircling the underside of the drum and spaced from the drum face an accurate predetermined distance which is equivalent to the thickness of the board being produced. The belt is under tension to apply pressure against the mixture of wood chips and binder fed into the space between the belt and the drum. Means is provided spaced from the discharge side of the drum to saw off lengths of board from the continuous web produced, including a clamp to arrest forward motion of the web while the saw is in operation.

BACKGROUND OF THE INVENTION

This invention relates to an apparatus for the continuous production of chip board, having an endless steel belt upon which a layer of wood chips combined with binders is scattered and which runs continuously into a pressing device.

PRIOR ART

Pressing devices for chip boards are known, in which the chips treated with binders are scattered onto individual metal plates, which are then in several stages (Etagen) brought into a heated press. Through the use of individual sheet metal plates, the pouring or scattering of the wood chips cannot take place continuously. In particular, the pressing, as well as the charging and discharging of the press, does not take place continuously. The expenditure in machinery for the automatic execution of all the individual steps in the manufacture is, therefore, considerable. Furthermore, the chip board produced through the discontinuous manufacturing operation lacks uniformity, and, finally, the danger of damage to the individual plates and thereby the danger of increased rejection is especially high.

To partially avoid these drawbacks, a press has been proposed for the production of chip board in which the pouring of the layer to be pressed takes place continuously onto a steel band, with the pouring device and the steel band moving uniformly relatively to one another. However, the subsequent pressing takes place during an intermittent stopping of the advance of the steel band in one layer between two press platens. Despite the continuous pouring, therefore, the production process is not completely continuous. Correspondingly, the pouring in the case of this known apparatus takes place only sectionwise, in lengths corresponding to the lengths of chip boards to be produced.

Both the known apparatuses mentioned have in common the disadvantage that the pressing surfaces of the press platens are deformed more or less during the pressing depending on the attack point and distribution of the press cylinders, so that the thickness of the pressed chip board is not the same in all places. Appreciable deviations result which, because of the properties of the pressing plates, are independent of the thickness of the pressed plates, and therefore, are more serious the less the thickness of the pressed chip board. Chip board in the thickness of a few millimeters, therefore, cannot be manufactured with admissible tolerances on these known pressing devices. It is necessary, therefore, to grind the pressed thin chip board subsequently to a prescribed uniform thickness. The grinding is expensive and additionally the surface quality of the ground-down chip plates is very much poorer than that produced by the press platens.

In another apparatus proposed for the fully continuous manufacture of chip board, the pressing takes place by means of cooperating heated link belts (Gliederketten). However, uniform and fully-even heat conduction of the individual members of the link belts at the requisite high press pressure is virtually impossible. In particular, abutting plates yield at the transitions between the members, so that the surface quality of the chip board is extremely faulty in these areas. The pressed chip board must be ground to provide the desired smooth surface. This apparatus is also expensive to construct and the link belts are difficult to heat.

THE INVENTION

The present invention eliminates all these drawbacks in the known apparatus for the production of chip board. The apparatus is designed to operate completely continuously with high precision and uniformity and at the same time, is very simple in construction.

The apparatus of the invention comprises a heated press drum, against which there runs a belt under tension, disposed on the side of the drum against which the layer of wood chips lies, the drum being partially encircled by the belt.

Although in the apparatus according to the invention only one steel belt is used, upon which there is scattered a mixture of chips and binder, there is afforded a fully continuous pressing of the chips into chip board. This pressing is achieved solely through the contact pressure of the belt on the pressing drum which, of course, depends on the radius of curvature of the drum. Since the curvature cannot be chosen arbitrarily small (because it is determined by the thickness of the chip board to be manufactured), it is expedient to provide a contact pressure roller behind the belt to achieve an increased pressing action at the beginning of the pressing operation.

The heated press drum comes directly in contact with the layer of wood chips, so that the heat transfer into the layer takes place extremely rapidly. This is of especial significance for the quality of the chip board requires rapid heating at the very beginning of the pressing. A further advantage of the invention lies in the use of one belt only. Hence only the manufacturing tolerances of one belt can disadvantageously affect the thickness tolerance of the manufactured chip board.

Preferably at least one contact pressure roller is mounted in fixed position with respect to the surface of the press drum at the point where the belt meets the drum. There is thus provided a defined, accurate pressing gap or space where the layer of chips enters the pressing zone to assure exact thickness of the chip board to be manufactured. Subsequently additional contact pressure rollers can be provided to exert a yielding pressure on the belt and the chips.

A special difficulty in the case of the apparatus of the invention is yielded from the size of the pressing roller by reason of the practical requirements with respect to the thickness of the chip board to be produced. The flexibility, elasticity and stability of shape after the pressing of the chip board depends upon the pressing and heating time, and this in turn is determined by the size of the drum and the degree of encircling by the belt. The belt carrying the layer of chips cannot run onto the pressing drum at an arbitrary place. It is expedient that the belt in the zone upstream of the run-on point run horizontally toward the pressing drum, and the run-on point, be beneath the center of the press drum. With this arrangement, a relatively sharp angle is formed between the drum surface and the belt in front of the run-on point by reason of the large diameter of the drum. Because of this acute angle, only low force components arise in the pressing which tend to press the wood chips out of the entry gap in a direction contrary to the direction the belt is traveling. Hence, wood chips do not build up at the entry gap, nor does the layer thickness change according to more or less severe thrusting together of the chips in the conveyance direction, which would alter the thickness of the manufactured chip board.

For avoiding the sliding together or sliding up of the wood chips at the entry gap or the run-on point onto the press drum it is also desirable that the belt run with a downward inclination in the zone of the run-on point. The weight of the wood chips on the oblique underlayer formed by the belt at the run-on point tends to draw the chips into the pressing gap. Through suitable choice of the inclination, these forces can be increased to the point where they nullify the substantially opposite force components caused by the pressing. Thereby a uniform layer thickness is assured.

If one of the last two measures mentioned is taken, then an orderly entry of the chips into the pressing gap is assured even if the first contact pressure roller has a smaller diameter than the drum. According to the invention, therefore, the diameter of the contact pressure roller, for reasons of construction and costs, can be kept small in relation to the diameter of the drum.

A further feature of the invention consists in bringing the belt in contact with the contact pressure roller in advance of the run-on point and in heating the contact pressure roller. Thereby the belt is preheated by the contact pressure roller before it reaches the run-on point. The layer of wood chips is already preheated to a temperature suitable for the pressing proces as it enters the press gap formed by the heated wall of the drum and the belt. Heating from both sides results in an especially good quality chip board.

Another feature of the invention consists in discharging the chip board from the press drum as a web freely distended in arcuate shape. Clamping means spaced from the discharge side of the drum is provided to arrest the advance of the board for the brief time required to saw off a length of board. A transversely movable saw is provided adjacent the clamping means for this purpose. This makes possible the use of a simple construction for the cutting and sawing device despite the continuous emergence of the chip board in the form of a web. Hitherto it was necessary to move the cutting or sawing device during the cutting or sawing along with the steadily advancing chip board web. By reason of the partially-free advance of the chip board into space, the loop thus formed can increase, whereby the brief arrest is possible for the purpose of sawing.

DETAILED DESCRIPTION

With the aid of the drawing the invention will be explained in detail by way of illustrative example. The drawing shows a side view of the apparatus, semidiagrammatically. By means of a scattering machine 1, chips 2 combined with a suitable binder are scattered on a flexible metal belt 3 which runs continuously in the direction of an arrow 4 over a table 5. An entirely uniform layer 6 of chips is placed on the belt. The endless belt 3 advances with the layer 6 onto a pressing drum 8, after it has passed over a heated contact pressure roller 7. The belt 3 encircles the lower portion of heated press drum 8. Additional contact pressure rollers 9, 10, 11 and 12 may be employed to press the belt against the press drum 8 at spaced points. The belt 3 then runs about the contact pressure roller 12 and a deflecting roller 13, which is biased in the direction of an arrow 14 and thus acts as tensioning roller, as well as over a deflecting roller 15 and back to the table 5.

The belt 3 is preheated by the heated contact pressure roller 7, so that the chips 6 are preheated in the zone of the contact pressure roller 7. The layer 6 on entering the gap between the contact pressure roller 7 and the press drum 8 takes an obliquely downward-inclined path. Thereby, by reason of the weight of the chips, gravity causes them to flow into the press gap. The inclination of the belt 3 before the run-on point must not, of course, be so oblique that the chips slip on the belt.

The contact pressure roller 7, as well as the press drum 8, is mounted in fixed position, so that between the contact pressure roller 7 and the press drum 8 there is formed an exactly defined gap, to the size of which the layer of wood chips is compressed. Since the contact pressure roller 7 and the press drum 8 are rotary bodies, they can be manufactured and mounted with great precision. The gap formed between them is correspondingly precise. Since there is only one belt 3, this accuracy is only slightly influenced adversely by the tolerances in manufacturing the belt.

After the layer of wood chips has been compressed to the requisite thickness in the gap between the contact pressure roller 7 and the press drum 8, it moves along with the surface of the drum 8, the encircling belt 3 providing the necessary contact pressure on the drum 8. The additional contact pressure rollers 9, 10, 11 and 12 may bring about brief pressure increases in order to assure an especially intimate bonding of the chips. The roller 12 serves simultaneously as a contact pressure roller and as a belt-deflecting roller.

The finished pressed chip board is discharged in the form of a band or web at the point where the belt 3 leaves the drum 8 and moves upwardly in an arc 16 curved oppositely to the curvature of the drum toward a cutting or sawing device 17. Mounted in front of sawing device 17 is a clamping device 18, whose foot, during the operating of the cutting or sawing device 17, presses the chip board against a table 19 and thereby holds it securely against continued movement for a short time. While the chip board is at rest in the zone of the sawing device 17, the saw-blades 20 swing down and in the desired manner cut the chip board transversely to the longitudinal axis of the web 16. During the holding of the chip board by the foot of the clamping device 18, the arc 16 increases somewhat, due to the continued movement of the web while a portion is being held.

After sawing, chip boards cut to length run on over rollers 21 to a stack, not shown.

Through the free distention of the chip board in an arc having opposite curvature from the curvature imparted by the drum, the curvature of chip board resulting from the pressing is reduced or nullified.

Several sawblades 20 may be arranged in one row transversely over the chip board, each driven by a motor 22, and mounted on pivot arm 23, swingable on pins 24 transversely to the chip board and against it. The pins 24 are mounted in fixed brackets 25. The swinging of the pivot arms 23 may be accomplished through pneumatic cylinders, not shown. Through the simultaneous operating of several saws in this manner, the cutting speed is increased in proportion to the number of sawblades 20. Such a sawing device is also advantageously usable by itself.

It is to be understood that the embodiment of the invention which has been described is merely illustrative of one application of the principles of the invention. Numerous modifications may be made to the disclosed embodiment without departing from the true spirit and scope of the invention.

What is claimed is:
1. A method for the continuous production of chip board from binder and wood chips which comprises the steps of:
  (a) continuously scattering a mixture of binder and wood chips on a continuously moving belt in contact with a revolving contact pressure roller;
  (b) continuously pressing and heating said mixture on said belt in an accurately spaced press gap to produce a layer of wood chips having a predetermined thickness;
  (c) said press gap formed by a revolving, heated press roller which is accurately spaced apart from the revolving contact pressure roller; and,
  (d) further pressing and heating said wood chip layer between said belt and press roller to intimately bond the binder and chips and to form a continuous bond of chip board.

2. A method according to claim 1 which includes heating said contact pressure roller to heat the mixture before it enters the press gap.

3. A method according to claim 1 which includes momentarily arresting the movement of the continuous band of chipboard and distending the board in the form of an arc and transversely sawing the arrested chipboard into lengths.

4. A method according to claim 1 which includes passing said mixture downwards into said press gap.

5. Press apparatus for the continuous manufacture of chipboard from binder and wood chips comprising a horizontally disposed heated press drum, an endless flexible metal belt surrounding and spaced from the lower portion of said drum, means for tensioning said belt to compress the chips against the surface of the drum, said tensioning means including at least one heated contact pressure roller mounted parallel to said drum in contact with the outside of said belt to regulate the thickness of the chipboard produced and to heat the wood chips through the belt before they enter the press apparatus and to accurately space the belt from the drum.

6. The apparatus of claim 5 which also includes clamping means spaced from the discharge side of said drum and saw means adjacent said clamping means to saw the chipboard; said saw means movable only laterally across the chipboard, said clamping means adapted to arrest the chipboard emerging from the press to permit the saw to cut the board into lengths, the portion of the board which emerges during clamping being distended in the form of an arc into the space between the discharge side of said drum and said clamping means.

7. The apparatus of claim 5 in which said pressure roller is mounted below the center of the drum where the chips enter the press.

8. The apparatus of claim 5 in which said belt is inclined downwardly in the zone where the chips enter the press.

9. The apparatus of claim 8 in which a portion of the belt upstream of the drum is horizontally disposed to receive chips.

10. The apparatus of claim 6 in which said movable saw means comprises a plurality of saws aligned transversely of the length of said moving chip board to accelerate the sawing.

References Cited
UNITED STATES PATENTS

| 2,544,019 | 3/1951 | Heritage | 425—83 X |
| 3,477,890 | 11/1969 | Kitaj | 156—79 |
| 3,039,137 | 6/1962 | Smith et al. | 156—369 X |
| 1,106,437 | 8/1914 | Baldwin | 156—576 X |
| 2,489,079 | 11/1949 | Clark et al. | 156—376 |

FOREIGN PATENTS

| 937,202 | 12/1955 | Germany | 156—375 |

PHILIP DIER, Primary Examiner

U.S. Cl. X.R.
156—510, 582; 425—83